(12) United States Patent
Nakamura

(10) Patent No.: US 6,496,369 B2
(45) Date of Patent: Dec. 17, 2002

(54) ELECTRONIC APPARATUS HAVING HEAT SINK FOR COOLING HEAT GENERATING COMPONENT

(75) Inventor: Hiroshi Nakamura, Ome (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/892,571

(22) Filed: Jun. 28, 2001

(65) Prior Publication Data

US 2002/0018337 A1 Feb. 14, 2002

(30) Foreign Application Priority Data

Jun. 29, 2000 (JP) .......................... 2000-197232

(51) Int. Cl.[7] ................................................ H05K 7/20
(52) U.S. Cl. ..................... 361/697; 165/80.3; 312/236; 361/690; 454/184
(58) Field of Search ........................... 415/213.1, 214.1, 415/177, 178; 257/722; 174/16.3; 312/236; 454/184; 165/121–126, 80.3, 86, 287, 185, DIG. 138; 361/687, 690, 694–698, 703–705, 707, 709–712, 717–719

(56) References Cited

U.S. PATENT DOCUMENTS

| | | | | |
|---|---|---|---|---|
| 2,380,026 A | * | 7/1945 | Clarke | |
| 4,133,327 A | * | 1/1979 | Inoue | |
| 5,694,294 A | * | 12/1997 | Ohashi et al. | 361/687 |
| 5,732,666 A | * | 3/1998 | Lee | 123/41.05 |
| 6,104,607 A | * | 8/2000 | Behl | 361/687 |
| 6,113,485 A | * | 9/2000 | Marquis et al. | 454/184 |
| 6,125,924 A | * | 10/2000 | Lin | 165/122 |
| 6,151,211 A | * | 11/2000 | Dayan et al. | 361/690 |
| 6,175,492 B1 | * | 1/2001 | Nobuchi | 361/687 |
| 6,278,607 B1 | * | 8/2001 | Moore et al. | 361/687 |

FOREIGN PATENT DOCUMENTS

| | | |
|---|---|---|
| JP | 59-087844 | 5/1984 |
| JP | 06-021281 | 1/1994 |

* cited by examiner

*Primary Examiner*—Gerald Tolin
(74) *Attorney, Agent, or Firm*—Finnegan, Henderson, Farabow, Garrett & Dunner, L.L.P.

(57) ABSTRACT

The electronic apparatus comprises a housing including a heat generating component and a heat sink. The housing can be displaced between a first usage form in which a ventilation port is set maintained in a standard opening shape and a second usage form in which the ventilation port is expanded to be larger than the standard opening shape. The heat sink has a plurality of heat radiation fins. The heat radiation range of the heat radiation fins expands when the housing is displaced from the first usage form to the second usage form and is reduced when the housing is displaced from the second usage form to the first usage form.

10 Claims, 5 Drawing Sheets

ELECTRONIC APPARATUS HAVING HEAT SINK FOR COOLING HEAT GENERATING COMPONENT

CROSS-REFERENCE TO RELATED APPLICATIONS

This application is based upon and claims the benefit of priority from the prior Japanese Patent Application No. 2000-197232, filed Jun. 29, 2000, the entire contents of which are incorporated herein by reference.

BACKGROUND OF THE INVENTION

1. Field of the Invention

The present invention relates to an electronic apparatus such as a portable computer including a heat generating component, and particularly to a structure for improving the cooling performance of the heat generating component.

2. Description of the Related Art

Recently, various portable electric apparatuses represented by notebook-type portable computers, mobile information apparatuses, and the like have been supplied. These electronic apparatuses are equipped with MPUs (Micro Processing Units) for processing multimedia information. In these MPUs, the electric power consumption has steadily increased in accordance with the increase of the processing speed and the number of multiple functions, and the heat generation amount during operation tends to increase rapidly. Heat radiation of the MPU must hence be improved in order to guarantee a stable operation of the MPU. Therefore, various heat-radiation/cooling means such as a heat sink, electric fan, and the like are indispensable.

Conventionally, in a portable computer mounting a MPU having a large heat generation amount, a heat sink is provided on the circuit board equipped with the MPU. The heat sink is thermally connected with the MPU, and cooling air is forcedly sent to the heat sink through the electric fan.

In this conventional cooling method, cooling air serves as a medium which removes heat from the MPU. In many MPUS, therefore, the cooling performance depends on the current strength of cooling air. Meanwhile, portable computers are designed to have a thin compact housing for containing the MPU, a heat sink, and the like. It is therefore difficult to secure an ideal air flow inside the housing, so that the air can be properly exhausted. As a result of this, the lack of proper ventilation of the cooling air leads to a rise in the temperature of the MPU. Consequently, it is impossible to attain a satisfactory cooling performance for the MPU.

A portable computer having an exhaust port whose open area is expandable upon requirements is conventionally known as a measure which solves the above problem. In this portable computer, a part of the peripheral wall of the housing is constructed by a movable wall, and an end of this movable wall is exposed to the exhaust port. The movable wall can shift between a first position in which the exhaust port is defined to be a standard shape and a second position at which the exhaust port is enlarged more than the standard shape. When the movable wall is shifted from the first position to the second position, the open area of the exhaust port is increased so that the cooling air is more easily exhausted.

Therefore, cooling air can easily exit the housing, and accordingly, the amount of cooling air guided to the heat sink increases. Thus, thermal exchange can be efficiently carried out between cooling air and the heat sink, so that the cooling performance of the MPU can be improved.

However, according to conventional portable computers, an increase of the flow amount is very small in comparison with the heat generation amount, although the flow amount of cooling air guided to the heat sink is increased. In addition, the heat radiation area of the heat sink which contributes to heat radiation does not change but is maintained constantly. Therefore, a remarkable improvement of the cooling performance of the MPU cannot be expected even if the flow amount of cooling are guided to the heat sink increases.

MPUs for use in portable computers are expected to attain higher speeds and perform more functions in the near future. Hence, the heat generation amount of the MPU is assumed to increase remarkably. Therefore, it cannot be said that the conventional cooling method of merely expanding the open area of the exhaust port sufficiently respond to the increase of the heat generation amount of the MPU. Consequently, it is considered that the cooling performance of the MPU will be insufficient or be limited.

BRIEF SUMMARY OF THE INVENTION

The present invention has an object of providing an electronic apparatus capable of greatly improving the heat radiation performance of a heat sink and of maintaining a proper operating environment temperature of a heat generating component.

To achieve the above object, an electronic apparatus according to the first aspect of the present invention comprises: a housing having a ventilation port and being able to be displaced between a first usage form in which the ventilation port is set in a standard opening shape, and a second usage form in which the ventilation port is enlarged to be larger than the standard opening shape; a heat generating component contained in the housing; and a heat sink thermally connected with the heat generating component and contained in the housing so as to face the ventilation port, the heat sink having a plurality of heat radiation fins whose heat radiation range expands when the housing is displaced from the first usage form to the second usage form and is reduced when the housing is displaced from the second usage form to the first usage form.

In this structure, heat from the heat generating component is transferred to the heat sink by thermal conduction, and is diffused in the housing through the surface of the heat sink and the heat radiation fins. When the housing of the electronic apparatus is displaced from the first usage form to the second usage form, the heat radiation fins are deformed so as to enlarge their heat radiation range. In this manner, the contact area between the heat radiation fins and air increases so that the heat from the heat generating component can be efficiently radiated.

Therefore, when the heat generation amount of the heat generating component increases, the heat radiation performance of the heat sink can be improved so as to comply with increase of the heat generation amount, by displacing the housing. Accordingly, it is possible to maintain a sufficient cooling performance of the heat generating component even if the installation space for the heat sink is limited due to downsizing of the housing.

To achieve the above object, an electronic apparatus according to the second aspect of the present invention comprises: a housing including a heat generating component; and a heat sink contained in the housing for receiving heat from the heat generating component. The heat sink includes a plurality of heat radiation fins made of shape-memory alloy, the heat radiation fins stand up with an interval maintained between each other when the heat sink receives heat from the heat generating component and a temperature of the heat radiation fins reaches a shape-memory range, and the heat radiation fins are elastically deformed when the temperature of the heat radiation fins exits the shape-memory range.

In this structure, heat from the heat generating component is transferred to the heat sink by thermal conduction, and is diffused in the housing 4 through the surface of the heat sink and the heat radiation fins. In a stage before the temperature of the heat radiation fins reaches a shape-memory temperature, the heat radiation fins are in a flexible state and can be deformed into a free shape. Therefore, the heat radiation fins are deformed into a shape in which their heat radiation range is reduced while the heat generation amount of the heat generating component is small.

When the temperature of the heat radiation fins reaches the shape-memory temperature, these heat radiation fins stand up with an interval maintained between each other due to the shape-memory effect, so that the heat radiation range expands. Accordingly, adjacent heat radiation fins move apart from each other, so that gaps which allows air to pass are formed between the heat radiation fins each other. As a result of this, the contact area between the heat radiation fins and air increases so that the heat transferred to the heat radiation fins from the heat generating component can be efficiently radiated. Therefore, the heat radiation performance of the heat sink can be improved so as to comply with an increase of the heat generation amount of the heat generating component, by utilizing the shape-memory effect of the heat radiation fins.

To achieve the above object, an electronic apparatus according to the third aspect of the present invention comprises: a housing including a heat generating component and having an exhaust port; a movable wall associated with the housing, forming part of the exhaust port, the movable wall being supported on the housing such that the movable wall is movable between a first position at which the exhaust port is defined by a standard opening shape and a second position at which the exhaust port is expanded to be larger than the standard opening shape; a heat sink thermally connected with the heat generating component and contained in the housing so as to face the exhaust port, the heat sink having a plurality of heat radiation fins whose heat radiation range expands when the movable wall is moved to the second position and is reduced when the movable wall is moved to the first position; and a fan contained in the housing, for blowing cooling air toward the heat sink such that the cooling air passes between the heat radiation fins and is exhausted to the outside of the housing through the exhaust port.

In this structure, heat from the heat generating component is transferred to the heat sink by thermal conduction, and is diffused in the housing through the surface of the heat sink and the heat radiation fins. The heat sink receives cooling air sent from the fan, so that the heat from the heat generating component transferred to the heat sink and the heat radiation fins is removed by the cooling air. The cooling air warmed up by thermal exchange with the heat sink is exhausted to the outside of the housing.

When the movable wall of the housing is moved from the first position to the second position, the opening shape of the exhaust port is expanded so that the exhaust resistance of the cooling air is reduced. In this manner, cooling air tends to come out from the inside of the housing, so that the flow amount of the cooling air increases. In addition, the heat radiation fins of the heat sink are deformed so as to enlarge their heat radiation range, following the expansion of the opening shape of the exhaust port. In this manner, the contact area between the heat radiation fins and air increases.

As a result of this, cooling air can be actively guided as much as possible to the heat radiation fins whose heat radiation range is expanded. The heat transferred to these heat radiation fins from the heat generating component can be efficiently radiated to the outside of the housing. Therefore, the heat radiation performance of the heat sink can be improved in compliance with increase of the heat generation amount of the heat generating component, so that it is possible to maintain the cooling performance of the heat generating component.

To achieve the above object, an electronic apparatus according to the fourth aspect of the present invention comprises: a housing including a heat generating component; and a heat sink contained in the housing, thermally connected with the heat generating component, and having a plurality of heat radiation fins whose heat radiation range changes in accordance with a heat generation amount of the heat generating component.

In this structure, heat from the heat generating component is transferred to the heat sink by thermal conduction, and is diffused in the housing through the surface of the heat sink and the heat radiation fins. Since the heat radiation range of the heat radiation fins changes in accordance with the heat generation amount of the heat generating component, it is possible to improve the heat radiation performance of the heat sink in compliance with increase of the heat generation amount of the heat generating component. Accordingly, it is possible to improve the cooling performance of the heat generating component even if the installation space for the heat sink is limited due to downsizing of the housing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

DETAILED DESCRIPTION OF THE INVENTION

In the following, a first embodiment of the present invention will be explained with reference to FIGS. 1 to 5 where it is applied to a portable computer.

Figure 1:
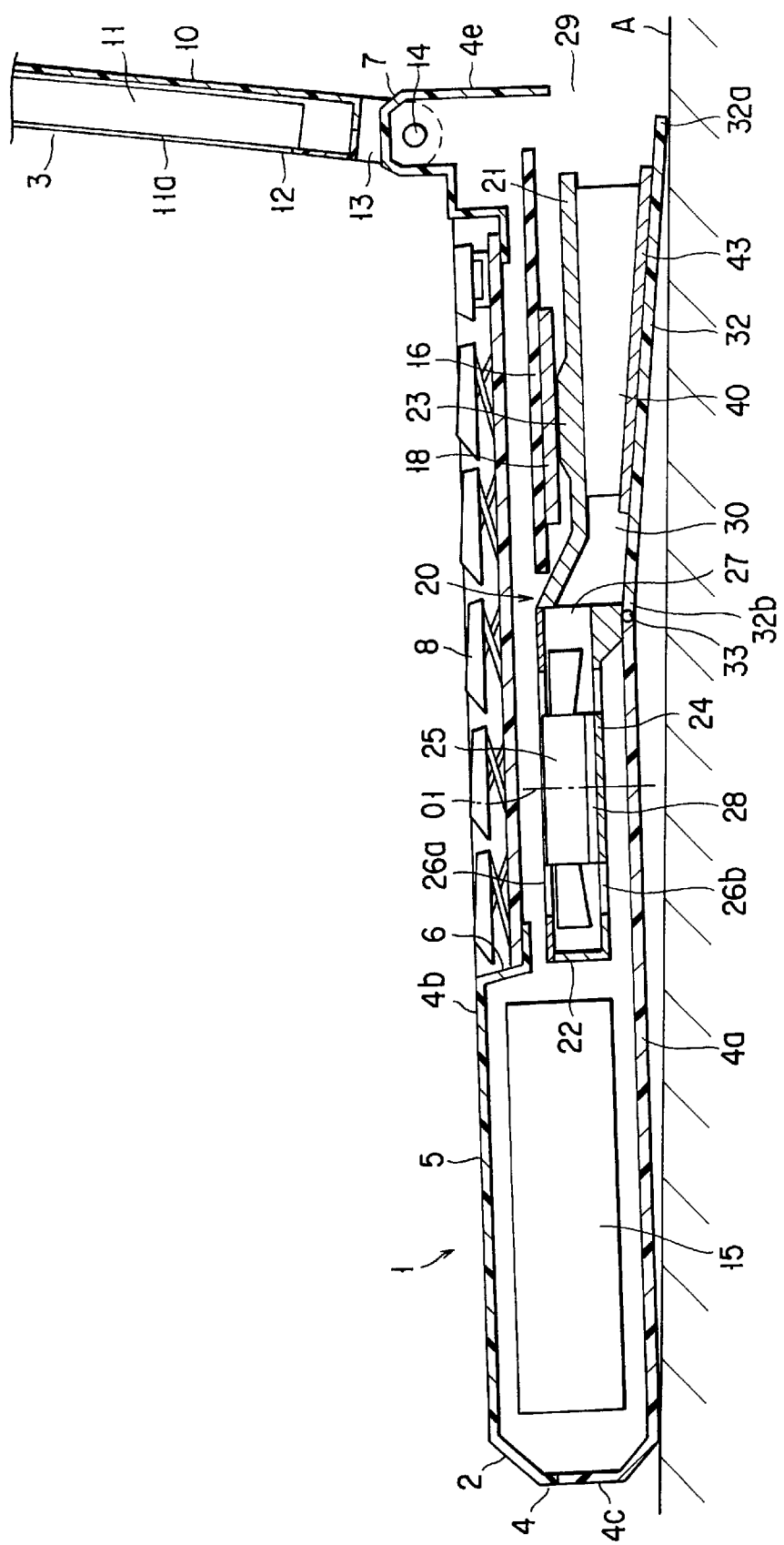
FIG. 1 is a cross-sectional view of a portable computer, showing a state in which the opening shape of the exhaust port and the heat radiation range of heat radiation fins are expanded respectively, in the first embodiment of the present invention.
Figure 2:
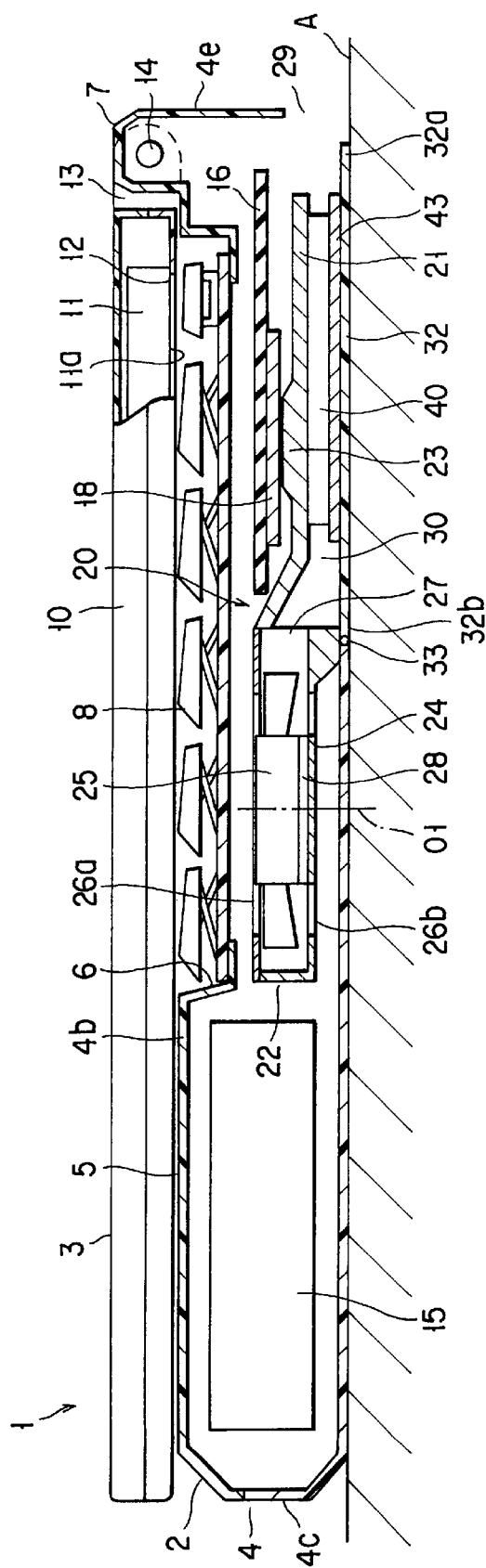
FIG. 2 is a cross-sectional view of a portable computer, showing a state in which the opening shape of the exhaust port is returned to a standard shape and the heat radiation range of the heat radiation fins is reduced, in the first embodiment of the present invention.
Figure 3:
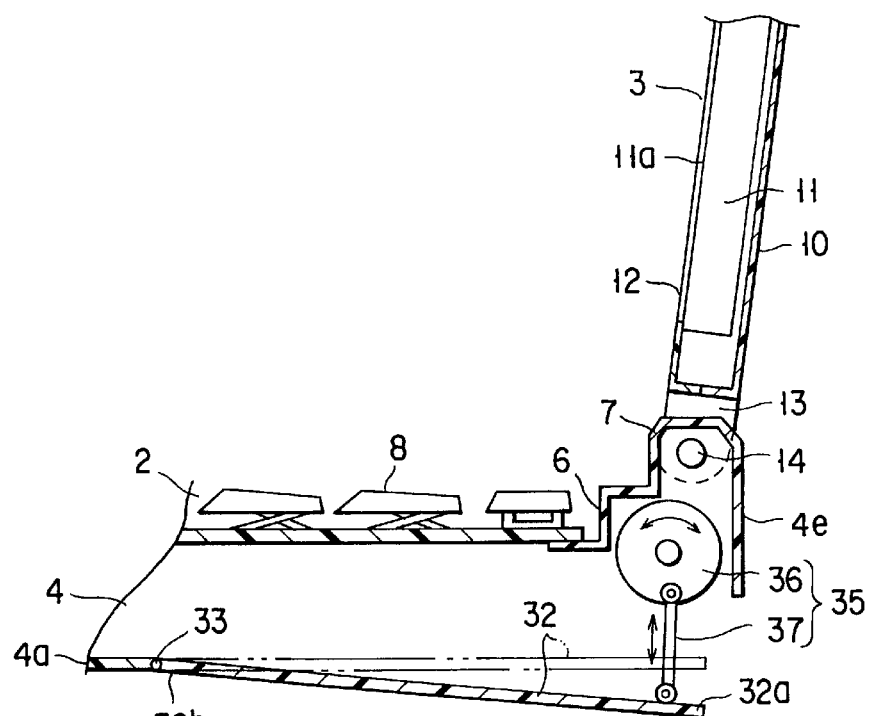
FIG. 3 is a cross-sectional view of a portable computer, showing a structure for moving the movable wall of the housing, in the first embodiment of the present invention.

FIGS. 1 and 2 discloses a portable computer 1 as an electronic apparatus. This portable computer 1 comprises a computer body 2 and a display device 3 supported on the computer body 2. The computer body 2 has a housing 4 set on a mount surface A similar to a top board of a table, for example. The housing 4 has a flat shape which includes a bottom wall 4a, an upper wall 4b, a front wall 4c, left and right walls 4d, and a rear wall 4e.

The upper wall 4b of the housing 4 has a palm rest 5, a keyboard mount portion 6, and a hollow convex part 7.

The palm rest 5 is positioned at a front end part of the housing 4. The keyboard mount portion 6 is positioned behind the palm rest 5, and a keyboard 8 is mounted on the keyboard mount portion 6. The convex part 7 is positioned at a rear end part of the housing 4, and extends in the widthwise direction of the housing 4 behind the keyboard 8.

The display device 3 comprises a display housing 10 and a liquid crystal display panel 11 contained in the display housing 10. The display housing 10 has an opening part 12 in its front surface. The liquid crystal display panel 11 has a display screen 11a for displaying an image, and this display screen 11a is exposed to the outside of the display housing 10 though the opening part 12.

The display housing 10 has a leg part 13 at an end thereof. The leg part 13 is projected toward an end part of the convex part 7, and is connected with the housing 4 through a hinge shaft 14. The display device 3 therefore can rotate between a closed position (shown in FIG. 2) where the device 3 is set down covering the palm rest 5 and the keyboard 8 and an open position (shown in FIG. 1) where the device 3 stands up exposing the palm rest 5, the keyboard 8, and the display screen 11a. The hinge shaft 14 is a pivot point of rotation of the display housing 10 and is rotated in a direction about the shaft, following the rotation of the display housing 10.

The housing 4 internally contains a peripheral device 15 such as a hard disk device or a CD-ROM drive device, and a circuit board 16. The circuit board 16 is provided in parallel with the bottom wall 4a of the housing 4, below the keyboard 8. A semiconductor package 18 functioning as a heat generating component is mounted on the lower surface of the circuit board 16. The semiconductor package 18 contains a micro-processor as the center of the portable computer 1 and is positioned at a rear part of the housing 4. This semiconductor package 18 processes multimedia information at a high speed and generates a very large amount of heat during operation. The semiconductor package 18 therefore requires cooling in order to maintain a stable operation.

The housing 4 also internally contains a cooling unit 20 for forcedly cooling the semiconductor package 18. The cooling unit 20 comprises a heat sink 21 and an electric fan 22. The heat sink 21 is made of metal material which has excellent thermal conductivity, such as aluminum alloy or the like. The heat sink 21 is set below the semiconductor package 18. The heat sink 21 has a plate-like shape which is one size larger than the package, and a heat receiving part 23 extending upward on the upper surface of the sink. The heat receiving part 23 is thermally connected with the semiconductor package 18 through a thermally conductive sheet or thermally conductive grease. Therefore, the heat of the semiconductor package 18 is transferred to the heat receiving part 23 and is thereafter diffused through the heat sink 21 therefrom by thermal conduction.

The electric fan 22 comprises a fan casing 24 and a centrifugal impeller 25. The fan casing 24 has a flat box-like shape integrated with the heat sink 21 and is continuous to the front end of the heat sink 21. The fan casing 24 has inlet ports 26a and 26b on its upper and bottom surfaces, respectively, and also has an outlet port 27 open to the heat sink 21.

The impeller 25 is contained in the fan casing 24, with its rotation axis 01 laid along the vertical direction. This impeller 25 is driven through a flat motor 28 supported on the bottom surface of the fan casing 24. As the impeller 25 is driven, air inside the housing 4 is taken in into the fan casing 24 through the inlet ports 26a and 26b. This air is discharged as cooling air through the outlet port 27.

As shown in FIGS. 1 and 2, the housing 4 of the portable computer 1 has an exhaust port as a ventilation port. The exhaust port 29 is opened in the rear wall 4e of the hosing 4 and faces the outlet port 27 of the fan casing 24. Therefore, a flow route 30 is formed, extending from the outlet port 27 of the fan casing 24 through the heat sink 21 to the outlet port 29.

Figure 4:
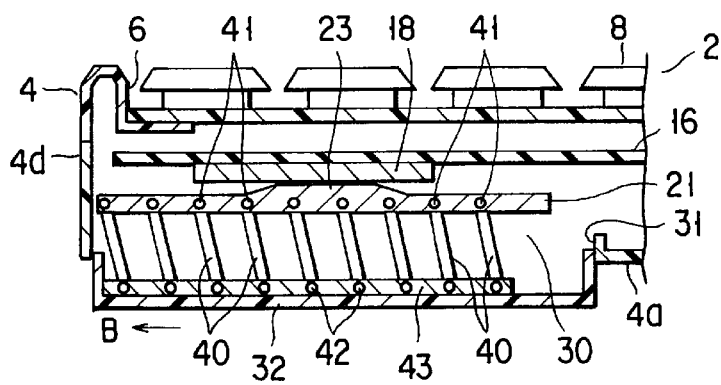
FIG. 4 is a cross-sectional view of a portable computer, showing a state in which the heat radiation range of the heat radiation fins is expanded, in the first embodiment of the present invention.
Figure 5:
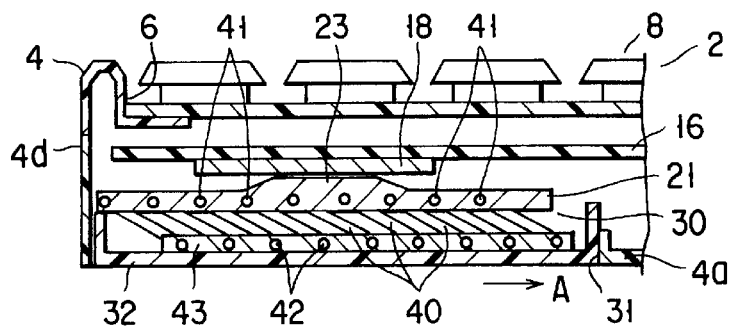
FIG. 5 is a cross-sectional view of a portable computer, showing a state in which the heat radiation range of the heat radiation fins is reduced, in the first embodiment of the present invention.

As shown in FIGS. 4 and 5, the bottom wall 4a of the housing 4 has an opening part 31. The opening part 31 is opened just below the heat sink 21 and communicates with the exhaust port 29. This opening part 31 is closed by a movable wall 32. The movable wall 32 has an end part 32a forming part of a lower edge of the opening of the exhaust port 29, and another end part 32b positioned in the side opposite to the end part 32a. The other end part 32b of the movable wall 32 is rotatably connected with the bottom wall 4a through the shaft 33. Therefore, the movable wall 32 is rotatable between a first position (shown in FIGS. 2 and 5) where the wall is positioned on the same plane as the bottom wall 4a and a second position (shown in FIGS. 1 and 4) where the wall projects below the bottom wall 4a.

In a state where the movable wall 32 is rotated to the first position, the lower edge of the opening of the exhaust port 29 is positioned on the same plane as the bottom wall 4a, and this exhaust port 29 is defined to have a standard opening shape. When the movable wall 32 is rotated from the first position to the second position, the lower edge of the opening of the exhaust port 29 is positioned below the bottom wall 4a, and the exhaust port 29 is expanded more than the standard opening shape. As the movable wall 32 rotates, the rear end part of the housing 4 is pushed up from the mount surface A. In this manner, the housing 4 is inclined to a forward tilting position where the palm rest 5 is lower than the rear end part of the housing 4.

Hence, the housing 4 can be shifted either to a first usage form in which the exhaust port 29 hold the standard opening shape and a second usage form in which the opening shape of the exhaust port 29 is expanded.

When the display housing 10 of the display device 3 is rotated, the movable wall 32 is rotated following the housing 10. To realize this, the convex part 7 of the housing 4 contains a link mechanism 35 which links the movable wall 32 with the display housing 10. The link mechanism 35 comprises a rotation member 36 and a link lever 37. The rotation member 36 is rotated and driven in a direction about the shaft by the hinge shaft 14. The link lever 37 is bridged between an outer circumferential part of the rotation member 36 and a rear end part of the movable wall 32. The link lever 37 converts rotary motion of the rotation member 36 into linear motion in the vertical direction, and transmits the linear motion to the movable wall 32.

Therefore, as the display housing 10 is rotated toward the closed position from the open position, the rotation member 36 is rotated in the anti-clockwise direction, pulling up the link lever 37, and the movable wall 32 is rotated to the first position by the link lever 37. Inversely, as the display housing 10 is rotated from the closed position to the open position, the rotation member 36 is rotated in the clockwise direction, pushing down the link lever 37. The movable wall 32 is rotated to the second position by the link lever 37. Accordingly, as long as the display housing 10 is rotated to the open position, the movable wall 32 is kept at the second position, so that the exhaust port 29 is extended to the maximum.

As shown in FIGS. 1, 4, and 5, the heat sink 21 has a plurality of heat radiation fins 40. The heat radiation fins 40 are made of metal material having excellent thermal conductivity. The heat radiation fins 40 each have a narrow long plate-like shape extending in the depth direction of the housing 4, and are arranged in parallel with intervals inserted in the width direction. These heat radiation fins 40 each have an end which is rotatably supported on the heat sink 21 by a pivot shaft 41. The pivot shaft 41 extends in the depth direction of the housing 4 and thermally connects the heat sink 21 with the heat radiation fins 40.

The heat radiation fins 40 project below the heat sink 21 and are exposed to the flow route 30. The other projecting ends of the heat radiation fins 40 are rotatably connected with a plate-like connection member 43 through another pivot shaft 42. The connection member 43 is made of metal material having thermal conductivity, and faces the heat sink 21 with the heat radiation fins 40 inserted therebetween. The pivot shaft 42 extends in the depth direction of the housing 4 and thermally connects the heat radiation fins 40 with the connection member 43. Therefore, the plurality of heat radiation fins 40 are connected with each other through the connection member 43 and can swing together with the connection member 43 in the width direction of the housing 4.

The connection member 43 is slidably layered on the upper surface of the movable wall 32 and is movable in the width direction of the housing 4. As shown in FIG. 5, when the movable wall 32 is rotated to the first position, the connection member 43 is pushed up by the movable wall 32. By this pushing-up, the heat radiation fins 40 are rotated about the pivot shaft 41 as a fulcrum in the anti-clockwise direction shown in FIG. 5, and the connection member 43 slides along the movable wall 32 in the direction of the arrow A in FIG. 5. As a result of this, the heat radiation fins 40 are folded obliquely, layered on each other, so that the interval between every adjacent heat radiation fins 40 is reduced.

As shown in FIG. 4, the connection member 43 comes apart from the heat sink 21, as the movable wall 32 is rotated to the second position. As a result, the heat radiation fins 40 are rotated about the pivot shaft 41 as a fulcrum in the clockwise direction shown in FIG. 4, and the connection member 43 slides along the movable wall 32 in the direction of the arrow B in FIG. 4. As a result of this, the heat radiation fins 40 are developed so as to project downward from the heat sink 21, and the interval between every adjacent fins 40 is widened.

Accordingly, the heat radiation fins 40 are deformed such that the heat radiation range thereof is expanded or reduced, following the rotation of the movable wall 32.

In this structure, if the semiconductor package 18 generates heat during use of the portable computer 1, the heat of the semiconductor package 18 is transferred to the heat sink 21 through the heat receiving part 23. The heat transferred to the heat sink 21 is transferred to the heat radiation fins 40 and the connection member 43, and are radiated to the inside of the housing 4 from the surfaces of the heat radiation fins 40 and the connection member 43.

When the temperature of the semiconductor package 18 exceeds the guaranteed operation temperature, the impeller 25 of the electric fan 22 is rotated. As the impeller 25 rotates, air inside the housing 4 is sucked into the fan casing 24 from the inlet ports 26a and 26b. The air is sent as cooling air into the flow route 30 from the outlet port 27 of the fan casing 24, and is blown to the heat sink 21. The cooling air then passes through the heat radiation fins 40, cooling forcedly the heat sink 21 and the heat radiation fins 40 in the process of the flow.

The heat of the semiconductor package 18 transferred to the heat sink 21 and the heat radiation fins 40 is taken out by heat exchange with the cooling air. The cooling air thus warmed by the heat exchange is discharged to the outside of the housing 4 through the exhaust port 29.

As shown in FIG. 2, when the display device 3 is rotated to the closed position, the portable computer 1 is displaced into the first usage form. In this first usage form, the movable wall 32 of the bottom wall 4a is rotated to the first position where it is positioned on the same plane as the bottom wall 4a. Therefore, the exhaust port 29 is maintained in the standard opening shape, and the heat radiation fins 40 are folded so as to reduce the heat radiation range. Therefore, the heat sink 21 including the heat radiation fins 40 has a compact shape and can be contained in the housing 4 naturally.

When the display device 3 is rotated to the open position from the closed position, the portable computer 1 is displaced into the second usage form. When the display device 3 is rotated toward the open position, motion of the display housing 10 is transmitted to the movable wall 32 through the link mechanism 35. In this manner, the movable wall 32 is rotated from the first position to the second position, projecting below the bottom wall 4a. Therefore, as shown in FIG. 1, the housing 4 is inclined into a forward tilting position, and the exhaust port 29 is expanded from the standard opening shape so that the downstream end of the flow route 30 is expanded. Accordingly, the exhaust resistance of cooling air is reduced, so the cooling air flowing toward the exhaust port 29 through the flow route 30 tends to go out to the outside of the housing 4. Therefore, the flow amount of the cooling air flowing through the flow route 30 increases, thereby introducing a large amount of cooling air to the heat sink 21.

At the same time, as shown in FIG. 4, the connection member 43 connecting the heat radiation fins 40 moves downward, so that the heat radiation fins 40 are developed so as to project downward from the heat sink 21. In this manner, the heat radiation fins 40 extend into the flow route 30, and the interval between every adjacent heat radiation fins 40 is enlarged, so that the heat radiation range of the heat radiation fins 40 is enlarged. The contact area between the cooling air and the heat radiation fins 40 accordingly increases.

Hence, a large amount of cooling air can be introduced by the heat radiation fins 40 whose heat radiation range has been enlarged by displacing the portable computer 1 into the second usage form. In this manner, the heat of the semiconductor package 18 transferred to the heat radiation fins 40 can be efficiently radiated to the outside of the housing 4. As a result of this, the heat radiation performance of the heat sink 21 can be increased in compliance with the heat generation amount of the semiconductor package 18.

In the first embodiment, the opening shape of the exhaust port 29 is expanded by the movable wall 32 linked with the display housing 10, and the heat radiation range of the heat radiation fins 40 is enlarged. However, the present invention is not limited hitherto but the movable wall 32 may be separated from the display housing 10 and may be rotated singly.

Also, in the first embodiment, the electric fan 22 is driven when the temperature of the semiconductor package 18 reaches a guaranteed operation temperature. The present invention, however, is not limited hitherto. For example, the electric fan 22 may be driven continuously during use of the portable computer 1, and the rotation speed of the impeller 25 may be increased when the temperature of the semiconductor package 18 reaches the guaranteed operation temperature.

Figure 6:
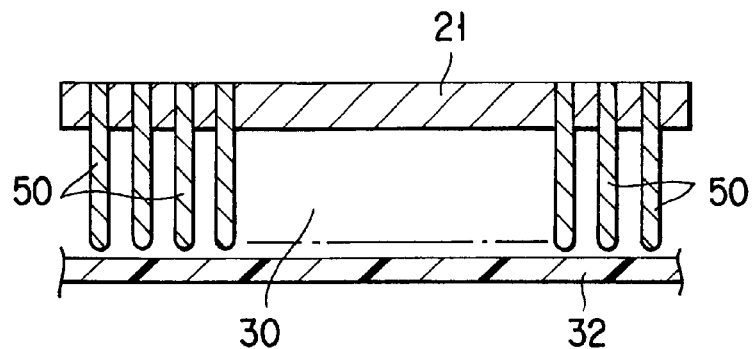
FIG. 6 is a cross-sectional view of a heat sink, showing a state in which the heat radiation range of the heat radiation fins is expanded, in the second embodiment of the present invention.
Figure 7:
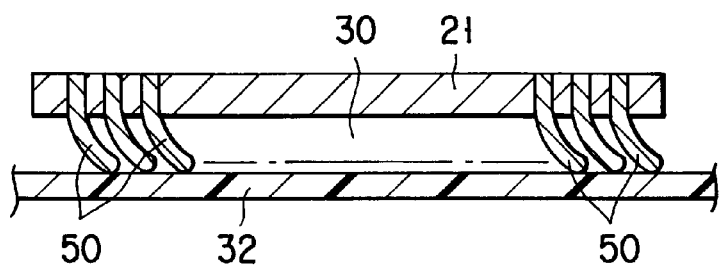
FIG. 7 is a cross-sectional view of a heat sink, showing a state in which the heat radiation range of the heat radiation fins is reduced, in the second embodiment of the present invention.

FIGS. 6 and 7 disclose the second embodiment of the present invention.

This second embodiment differs from the first embodiment in a point concerning heat radiation fins 50, although the basic structure of the portable computer 1 is the same as that of the first embodiment. Therefore, the second embodiment shows only a positional relationship between the heat sink 21 having the heat radiation fins 50 and the movable wall 32. The other points of the structure will be omitted therefrom.

The heat radiation fins 50 are each made of shape-memory alloy having a pin-like shape. The heat radiation fins 50 are arranged in a matrix on the lower surface of the heat sink 21. The heat radiation fins 50 each remember its own shape such that the shape maintains to be linear when the temperature of the fins reaches a guaranteed operation temperature of the semiconductor package 18, for example.

In a state where the temperature of the heat radiation fins 50 reaches a shape-memory range, the heat radiation fins 50 have a spring property. In addition, these heat radiation fins 50 project from the lower surface of the heat sink 21 with an interval maintained between each other, and the top ends of the radiation fins 50 face the movable wall 32. When the temperature of the heat radiation fins 50 comes to be lower than a setting temperature, the heat radiation fins 50 lose their spring property, and their flexibility increases. Therefore, as shown in FIG. 7, when the movable wall 32 is rotated to the first position, the heat radiation fins 50 are sandwiched between the movable wall 32 and the heat sink 21 and are deformed into a free form.

In this structure, in a state in which the semiconductor package 18 has a low temperature and the temperature of the heat radiation fins 50 does not reach a setting temperature, the heat radiation fins 50 have flexibility. Therefore, when the portable computer 1 is in the first usage form and the movable wall 32 is rotated to the first position, the heat radiation fins 50 are deformed, sandwiched between the movable wall 32 and the heat sink 21. Therefore, the heat radiation fins 50 are folded on each other so that their heat radiation range is reduced.

When the temperature of the heat radiation fins 50 reaches a setting temperature in accordance with temperature increase of the semiconductor package 18 in a state where the portable computer 1 is deformed into the second usage form, the heat radiation fins 50 each recover their linear shape due to the shape-memory effect. In this manner, the heat radiation fins 50 linearly project downward from the lower surface of the heat sink 21, and every adjacent heat radiation fins 50 come apart from each other, thereby enhancing the heat radiation range. Simultaneously, gaps which allow cooling air to pass are formed between these heat radiation fins 50. As a result of this, the contact area between the heat radiation fins 50 and the cooling air increases so that the heat of the semiconductor package 18 transferred to the heat radiation fins 50 can be efficiently radiated.

Thus, according to the second embodiment described above, the heat radiation performance of the heat sink 21 can be improved so as to match with increase in the heat generation amount of the semiconductor package 18, by utilizing the shape-memory effect of the heat radiation fins 50.

In case where the heat radiation fins 50 are made of shape-memory alloy, the movable wall 32 may be separated from the display housing 10, and the movable wall 32 may be rotated by using the change of the shape of the heat radiation fins 50.

According to this structure, when the heat radiation fins 50 are projected downward by the shape-memory effect, the movable wall 32 is pushed downward by the heat radiation fins 50, so that the movable wall 32 rotates from the first position to the second position. When the temperature of the heat radiation fins 50 comes to be lower than a setting temperature, the spring force pushing the movable wall 32 is lost, so that the heat radiation fins 50 are pushed by the movable wall 32 to the contrary and are deformed into free shape. Therefore, the movable wall 32 can be rotated to the first position from the second position by using together a return spring which acts to return the movable wall 32 to the first position. As a result of this, any special mechanism for rotating the movable wall 32 is not required, and thus, the cost can be reduced.

Figure 8:
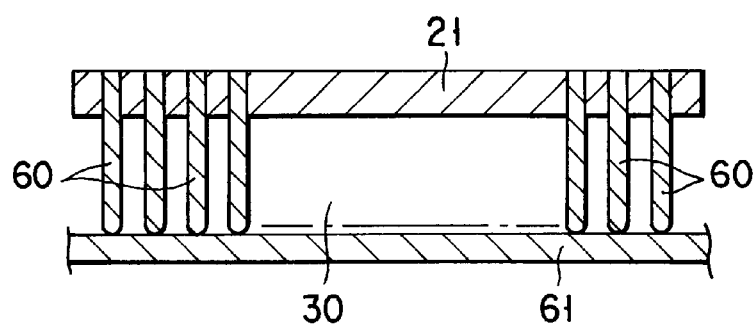
FIG. 8 is a cross-sectional view of a heat sink, showing a state in which the heat radiation range of the heat radiation fins is expanded, in the third embodiment of the present invention.
Figure 9:
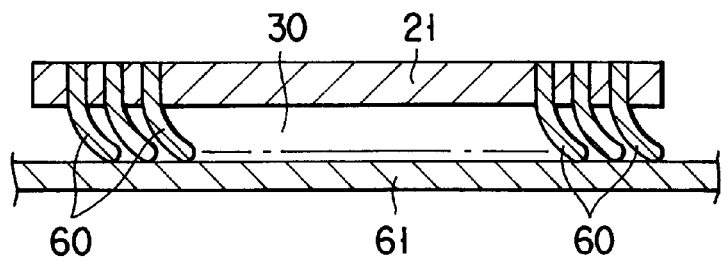
FIG. 9 is a cross-sectional view of a heat sink, showing a state in which the heat radiation range of the heat radiation fins is reduced, in the third embodiment of the present invention.

FIGS. 8 and 9 show a third embodiment of the present invention.

In the present third embodiment, heat radiation fins 60 are each formed of a flexible material which can be elastically deformed. The heat radiation fins 60 are arranged in a matrix on the lower surface of the heat sink 21, and project straight to the lower side of the heat sink 21.

A press member 61 is provided in the lower side of the heat sink 21. The press member 61 faces the heat sink 21 with the heat radiation fins 60 inserted therebetween. This press member 61 moves in directions in which they move close to and apart from the heat sink 21 in association with the motion of the movable wall 32.

In this structure, in a state where the portable computer 1 is in the first usage form and the movable wall 32 of the housing 4 is rotated to the first position, the press member 61 is pushed up in the direction in which it moves close to the heat sink 21, by the movable wall 32. Therefore, the heat radiation fins 60 are sandwiched between the press member 61 and the heat sink 21, and the fins are elastically deformed to be folded on each other, so that the heat radiation range is reduced.

When the portable computer 1 is displaced from the first usage form to the second usage form, the movable wall 32 is rotated to the second position, and the press member 61 moves apart from the heat sink 21, as shown in FIG. 8. In this manner, the press on the heat radiation fins 60 from the press member 61 is released, and the heat radiation fins 60 recover their original shape due to its own specific spring property. Therefore, the heat radiation fins 60 project straight downward from the lower surface of the heat sink 21, so that adjacent heat radiation fins 60 move from each other, enhancing the heat radiation range. At the same time, gaps which allow cooling air to pass are formed between the heat radiation fins 60 each other. As a result, the contact area between the heat radiation fins 60 and the cooling air increases so that the heat of the semiconductor package 18 transferred to the heat radiation fins 60 can be efficiently radiated.

Thus, according to the third embodiment described above, the spring property of the heat radiation fins 60 is used to improve the heat radiation performance of the heat sink 21 so as to comply with an increase of the heat generation amount of the semiconductor package 18.

Figure 10:
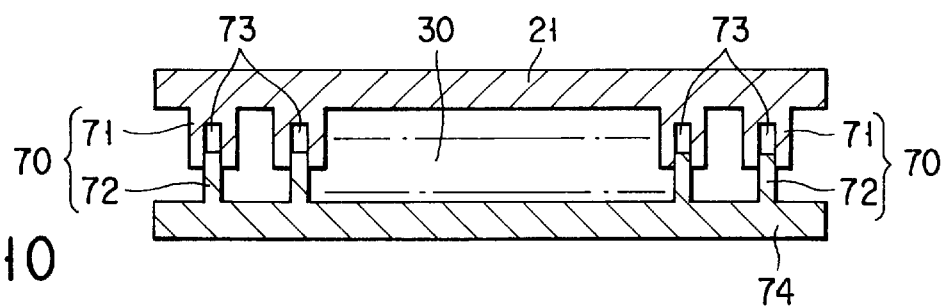
FIG. 10 is a cross-sectional view of a heat sink, showing a state in which the heat radiation range of the heat radiation fins is expanded, in the fourth embodiment of the present invention.
Figure 11:
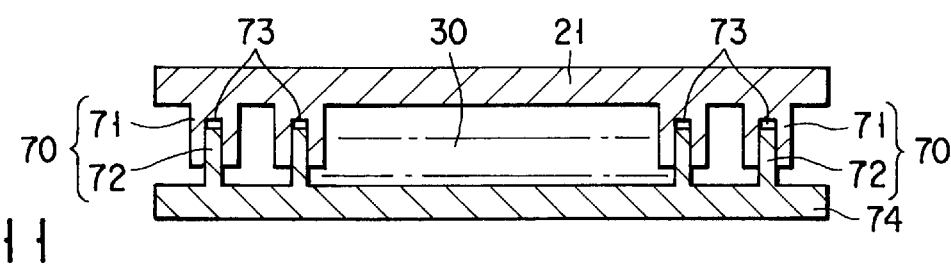
FIG. 11 is a cross-sectional view of a heat sink, showing a state in which the heat radiation range of the heat radiation fins is reduced, in the fourth embodiment of the present invention.

FIGS. 10 and 11 disclose a fourth embodiment of the present invention.

The fourth embodiment differs from the first embodiment in the point concerning heat radiation fins 70, although the basic structure of the portable computer 1 is the same as that of the first embodiment. Therefore, in the fourth embodiment, only the heat sink 21 having the heat radiation fins 70 will be shown in the FIGS., and the other points of its structure will be omitted.

A large number of heat radiation fins 70 are each constructed by a fixing part 71 and a movable part 72. The fixing parts 71 are arranged in a matrix on the lower surface of the heat sink 21. These fixing parts 71 are integrated with the heat sink 21 and project downward from the lower surface of the heat sink 21. Each fixing part 71 has an insertion hole 73. The insertion hole is opened in the lower surface of the fixing part 71. The movable part 72 has a straight shaft-like shape, and is detachably inserted in the insertion hole 73 of the fixing part 71. The outer circumferential surface of the movable part 72 slidably contacts the inner surface of the insertion hole 73. In this manner, the movable part 72 and the fixing part 71 are thermally connected with each other. The lower end of the movable part 72 is projected from the insertion hole 73.

The lower end of the movable part 72 is integrally connected through a connection member 74. This connection member 74 faces the heat sink 21 with the fixing parts 71 inserted therebetween, and can be moved in directions in which the member 74 moves close to and away from the heat sink 21, with the movable parts 72 used as guides. Also, the connection member 74 is layered on the movable wall 32 of the housing 4, like the connection member 43 of the first embodiment.

In this structure, in a state in which the portable computer 1 is in the first usage form and the movable wall 32 is rotated to the first position, the connection member 74 is pushed up in the direction in which the member 74 moves close to the heat sink 21, by the movable wall 32. Therefore, the movable parts 72 are pushed into the insertion holes 73 of the fixing parts 71, so that the total length of the heat radiation fins 70 are shortened. Thus, the heat radiation fins 70 are in a state in which their heat radiation range is reduced.

When the portable computer 1 is displaced in the second usage form, the movable wall 32 is rotated to the second position, and the connection member 74 moves away from the heat sink 21. In this manner, as shown in FIG. 10, the movable parts 72 are pulled out of the insertion holes 73 of the fixing parts 71, so the total length of the heat radiation fins 70 is elongated. As a result of this, the heat radiation range of the heat radiation fins 70 is enlarged and the contact area between the heat radiation fins 70 and cooling air increases, so that the heat of the semiconductor package 18 transferred to the heat radiation fins 70 can be radiated efficiently.

Thus, according to the fourth embodiment described above, the heat radiation performance of the heat sink 21 can be improved so as to match with increase of the heat generation amount of the semiconductor package 18, by extending or retracting the heat radiation fins 70.

Also, in each of the above embodiments, the portable computer 1 is displaced into either the first or second usage form by rotating the movable wall 32 of the housing 4 to the first or second position. The present invention, however, is not limited hitherto.

Figure 12:
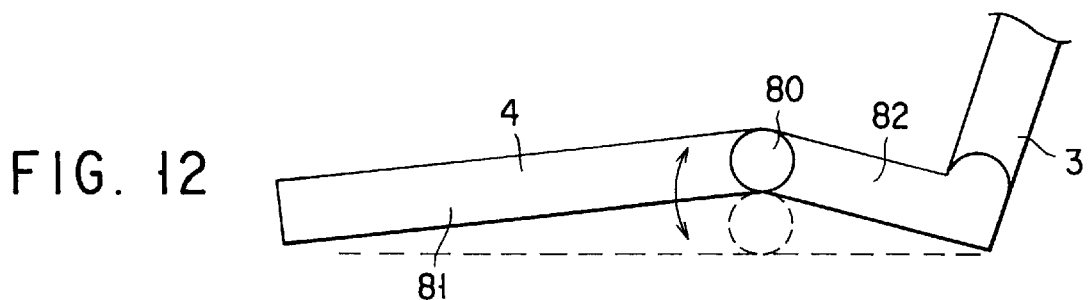
FIG. 12 is a side view of a portable computer, schematically showing a state in which the form of the housing is changed, in the fifth embodiment of the present invention.

For example, in the fifth embodiment of the present invention shown in FIG. 12, a hinge part 80 is installed at an intermediate part along the depth direction of the housing 4. The housing 4 is divided into a front half part 81 and a rear half part 82 from the hinge part 80 as a boundary, and the front half part 81 and the rear half part 82 are rotatably connected with each other by the hinge part 80. Therefore, the housing 4 can be displaced between the first usage form in which the front half part 81 and the rear half part 82 are positioned on one same plane and the second usage form in which the front half part 81 and the rear half part 82 are folded to be inclined upwardly along directions toward the hinge part 80.

According to this fifth embodiment, the connection member 43 in the first embodiment, the press member 61 in the third embodiment, and the connection member 74 in the fourth embodiment can be operated by utilizing the operation of folding the housing 4. The heat radiation performance of the heat sink 21 can therefore be improved in accordance with increase of the heat generation amount of the semiconductor package 18.

Figure 13:
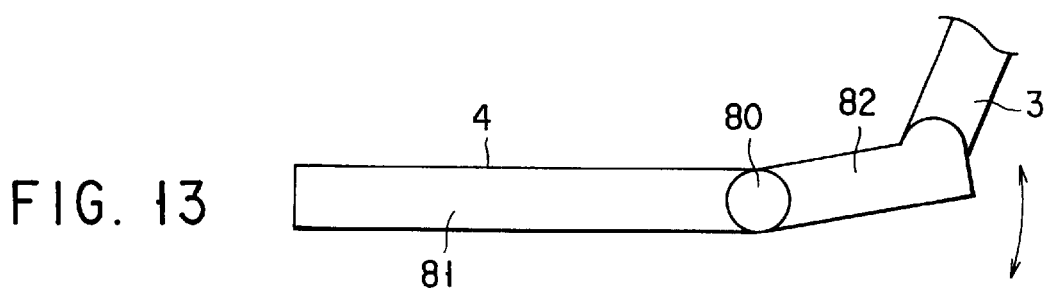
FIG. 13 is a side view of a portable computer, schematically showing a state in which the form of the housing is changed, in the sixth embodiment of the present invention.

A sixth embodiment of the present invention shown in FIG. 13 differs from the fifth embodiment in the folding direction of the housing 4. The housing 4 of the sixth embodiment can be displaced between the first usage form in which the front half part 81 and the rear half part 82 are positioned on one same plane and the second usage form in which the front half part 81 and the rear half part 82 are folded and inclined downward along the directions toward the hinge part 80.

Also, in this structure, the connection member 43 in the first embodiment, the press member 61 in the third embodiment, and the connection member 74 in the fourth embodiment can be operated by utilizing the operation of folding the housing 4.

Figure 14:
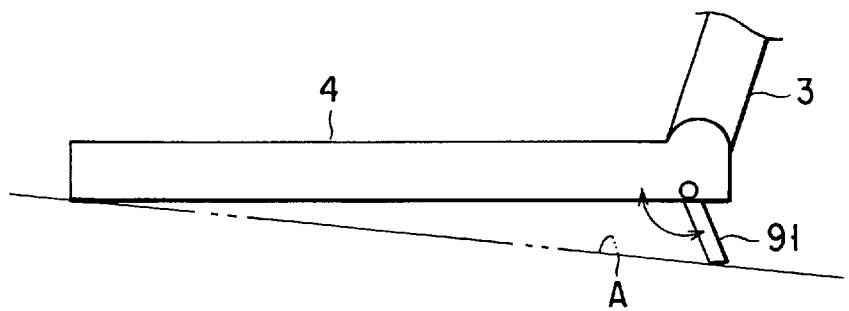
FIG. 14 is a side view of a portable computer, schematically showing a state in which the form of the housing is changed, in the seventh embodiment of the present invention.

In a seventh embodiment shown in FIG. 14, a foldable leg part 91 is provided at a rear end part of the housing 4. The leg part 91 is supported on the housing 4 to be rotatable between a containing position in which the leg part 91 is contained in the housing 4 and a use position in which it projects downward from the housing 4. In a state where the leg part 91 is rotated to the containing position, the bottom wall 4a contacts the mount surface A, and the housing 4 is kept horizontal. When the leg part 91 is rotated to the use position, the top end of the leg part 91 contacts the mount surface A, and the housing 4 is inclined into a forward tilting position.

Therefore, the housing 4 can be displaced between the first usage form in which the leg part 91 is contained and the second usage form in which the leg part 91 is used to incline the housing 4 into a forward tilting position.

According to the seventh embodiment as described above, the connection member 43 in the first embodiment, the press member 61 in the third embodiment, and the connection member 74 in the fourth embodiment can be operated by utilizing the operation of rotating the leg part 91. The heat radiation performance of the heat sink 21 can therefore be improved in accordance with increase of the heat generation amount of the semiconductor package 18.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:

a housing having a ventilation port, the ventilation port changing between a first state in which the ventilation port has a standard opening and a second state in which the ventilation port is expanded to be larger than the standard opening;

a heat generating component contained in the housing; and a heat sink thermally connected with the heat generating component and contained in the housing so as to face the ventilation port, the heat sink having a plurality of heat radiation fins, and shapes of the fins changing so that the heat radiation range is expanded while the ventilation port is in the second state, and is reduced while the ventilation port is in the first state.

2. The electronic apparatus according to claim 1, further comprising a fan contained in the housing, for blowing cooling air toward the heat sink such that the cooling air passes between the heat radiation fins and is exhausted to outside of the housing through the ventilation port.

3. The electronic apparatus according to claim 1, wherein the housing has a movable wall forming part of the ventilation port which is supported on the housing such that the movable wall can be shifted between a first position at which the ventilation port is maintained in the standard opening and a second position at which the opening of the ventilation port is expanded.

4. The electronic apparatus according to claim 3, wherein the heat radiation fins are arranged with an interval maintained between each other, an end of each of the heat radiation fins is connected rotatably with the heat sink, another end of each of the heat radiation fins is rotatably connected with a connection member facing the heat sink, and the connection member is moved by the movable wall in directions in which the connection member moves close to and apart from the heat sink.

5. The electronic apparatus according to claim 4, wherein while the movable wall is rotated to the first position, the heat radiation fins are folded such that the heat radiation fins are layered on each other between the heat sink and the connection member, and while the movable wall is rotated to the second position, the heat radiation fins stand up with an interval maintained from each other.

6. The electronic apparatus according to claim 3, wherein the housing has a bottom wall which includes the movable wall, and while the movable wall is moved to the second position, the movable wall inclines the housing into a position at which a front end part of the housing comes to be lower than a rear end part thereof.

7. The electronic apparatus according to claim 1, wherein each of the heat radiation fins is made of a springy material.

8. The electronic apparatus according to claim 1, wherein the heat radiation fins each include a fixing part integrated with the heat sink and a movable part connected with the fixing part such that the movable part can be inserted into and pulled off from the fixing part, and the movable part is inserted in the fixing part while the ventilation portion is in the first state, and is pulled off from the fixing part while the ventilation port is in the second state.

9. An electronic apparatus comprising:

a housing including a heat generating component and having an exhaust port;

a movable wall associated with the housing, forming part of the exhaust port, the movable wall being supported on the housing such that the movable wall is movable between a first position at which the exhaust port is defined by a standard opening and a second position at which the exhaust port is expanded to be larger than the standard opening;

a heat sink thermally connected with the heat generating component and contained in the housing so as to face the exhaust port, the heat sink having a plurality of heat radiation fins whose heat radiation range is expanded while the movable wall is moved to the second position and is reduced while the movable wall is moved to the first position; and a fan contained in the housing, for blowing cooling air toward the heat sink such that the cooling air passes between the heat radiation fins and is exhausted to the outside of the housing through the exhaust port.

10. The electronic apparatus according to claim 9, further comprising a display device supported on the housing such that the display device can be rotated between a closed position at which the display device is laid down so as to overlap the housing and an open position at which the display device stands up, and the movable wall moves to the first position while the display device is rotated to the closed position and the movable wall moves to the second position while the display device is rotated to the open position.

* * * * *